United States Patent

Brembach et al.

[15] 3,660,595

[45] May 2, 1972

[54] METHOD AND SYSTEM FOR CORRECTING COLOR ERRORS IN COLOR FILM DURING TELEVISION TRANSMISSION

[72] Inventors: Burkart Brembach; Alfred Eisinger; Hans Horneff; Heinrich Zahn, all of Darmstadt, Germany

[73] Assignee: Fernseh GmbH, Darmstadt, Germany

[22] Filed: Aug. 4, 1969

[21] Appl. No.: 848,768

[30] Foreign Application Priority Data

Aug. 8, 1968 Germany ......................P 17 62 714.4

[52] U.S. Cl. ......................178/5.2 A, 178/6.7 A, 178/5.4 CD

[51] Int. Cl. ........................................H04n 5/48, H04n 9/53

[58] Field of Search..............178/6.7 A, 5.2 R, 5.2 A, 5.4 CD

[56] References Cited

UNITED STATES PATENTS

| | | | |
|---|---|---|---|
| 2,947,810 | 8/1960 | Horsley | 178/6.7 A |
| 3,005,042 | 10/1961 | Horsley | 178/6.7 A |
| 3,424,860 | 1/1969 | Delvaux | 178/5.2 |
| 3,255,303 | 6/1966 | Kihara | 178/5.4 CD |

*Primary Examiner*—Robert L. Griffin
*Assistant Examiner*—John C. Martin
*Attorney*—Michael S. Striker

[57] ABSTRACT

Correction signals for correcting color errors are entered onto elongated signal carrier means moving synchronously with a color film, by an operator during viewing of the film prior to transmission. During transmission the correction signals are derived from the elongated signal carrier means and applied to the color matching units normally present. Each of these units affects the transmission of a particular color signal in response to the correction signals. The amplitudes of the color signals may be decreased, and further the contrast and black level may also be corrected.

13 Claims, 3 Drawing Figures

Patented May 2, 1972 3,660,595

2 Sheets-Sheet 1

Inventors:
Burkart Brembach
Alfred Eisinger
Hans Horneff
Heinrich Zahn
by
Attorney Inventors:
Burkart Brembach
Alfred Eisinger
Hans Horneff
Heinrich Zahn
by
Attorney

METHOD AND SYSTEM FOR CORRECTING COLOR ERRORS IN COLOR FILM DURING TELEVISION TRANSMISSION

BACKGROUND OF THE INVENTION

This invention relates to a method and system for correcting color errors in color films during color television transmission.

In particular, this invention relates to such methods and systems in relation to color matching units normally present in such color television systems, each of which is adapted to affect the transmission of a particular color signal.

The quality of the colors in a color film are highly variable. Variations may even occur within a single film. For this reason, color television transmission systems which are adapted to transmit color film contain so-called color matching units. These color matching units respond to correction signals which may have to be furnished quite frequently during a transmission.

In the known, conventional methods, the correction of color errors during transmission is achieved by having an operator monitor the picture to be transmitted and controlling the control matching unit by furnishing correction signals when required. However, this method has numerous drawbacks. For example, a certain amount of time is required to achieve correction, allowing uncorrected signals to reach the viewer. Furthermore, if the same film is transmitted a number of times, the correction has to be carried out during each transmission.

SUMMARY OF THE INVENTION

It is an object of the present invention to furnish a method and system whereby color errors in color film may be corrected automatically during the transmission of the color film.

In accordance with this invention, correction signals are entered upon elongated signal carrier means moving synchronously with the color film along a predetermined path. The signals are entered by an operator during a viewing preceeding transmission. During the transmission, the correction signals are read from the elongated signal carrier means. They are applied to the color matching units, thus causing said color matching units to affect the transmission of the color signals in such a manner as to compensate for color errors in the color film.

The method and system of this invention thus permits the correction signals to be entered upon the elongated signal carrier means, for example, a magnetic tape carrying the audio signals accompanying the color film, prior to transmission. Thus it is possible to repeat the viewing of the film and change the correction signals until an optimum picture results on the monitor. Furthermore, the correction, once completed, is available for all future color television transmissions of the same film.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
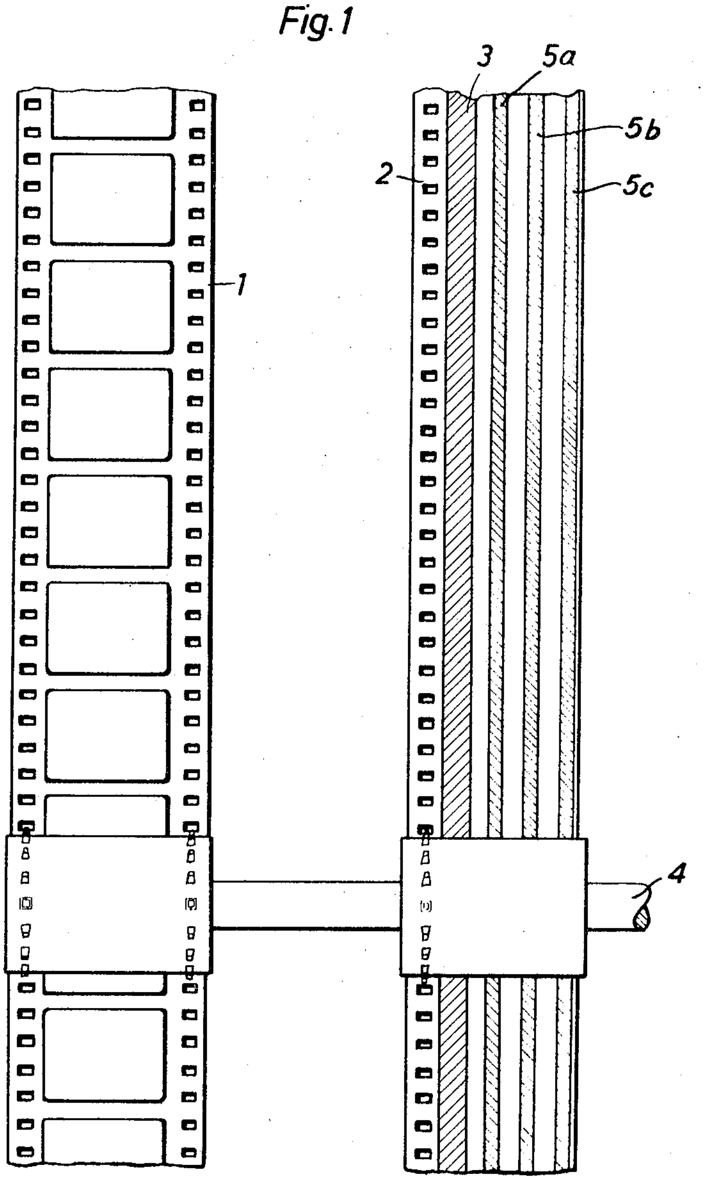
FIG. 1 shows a film and a magnetic tape synchronously transported with said film.

A preferred embodiment of the present invention will now be discussed in relation to the drawing.

FIG. 1 shows the color film, 1, and the elongated signal carrier means, namely a magnetic tape, 2, which has a track, 3, for carrying audio signals accompanying the film. Moving means, 4, transport the film and the magnetic tape in exact synchronism. The synchronism can further be assured by perforations in the tape. Such synchronism can of course also be achieved by an electric interlock system. A track, 5, which may serve to record audio signals in a different language to accompany the film, may be used in the present invention for carrying the correction signals. Alternatively, three tracks, *5a*, *5b* and *5c* in FIG. 1 may carry correction signals, each track being assigned to carry the correction signals for a particular color.

These correction signals are signals controlling the color matching unit. The color matching unit comprises a plurality of subunits, here three subunits, each of which affects the transmission of a particular color signal.

The additional equipment necessary to carry out the method of the present invention, over and above the equipment required for normal color film television transmission, consist solely of known electronic means for entering the correction signals on a tape, and deriving said signals from the tape and applying them to the color matching unit. For example, each of the correction signals may be applied to a magnetic head, *6a, b, c*, FIG. 1 which enter signals onto a narrow track *5a, b, c* respectively. The tracks may be very narrow, since the correction signals contain only relatively low frequencies. Entering upon the track may be accomplished by means of a frequency or amplitude modulated alternating voltage.

It is also possible to enter the correction signals in a time sequential manner onto a single track thus requiring only a single magnetic head. A single magnetic head may be also only required when the correction signals are centered as alternating entered of different frequencies.

Conventional television transmission systems for transmitting film comprise an oscillator for generating an alternating voltage for suppressing the audio signal. Since this oscillator is not required, either when the correction signals are entered upon the tape, or when transmission, it is possible to modulate the correction signals onto this voltage generator.

However, a particularly advantageous method for entering the correction signals consists of entering these signals not in analog form, but in digital form.

Figure 2:
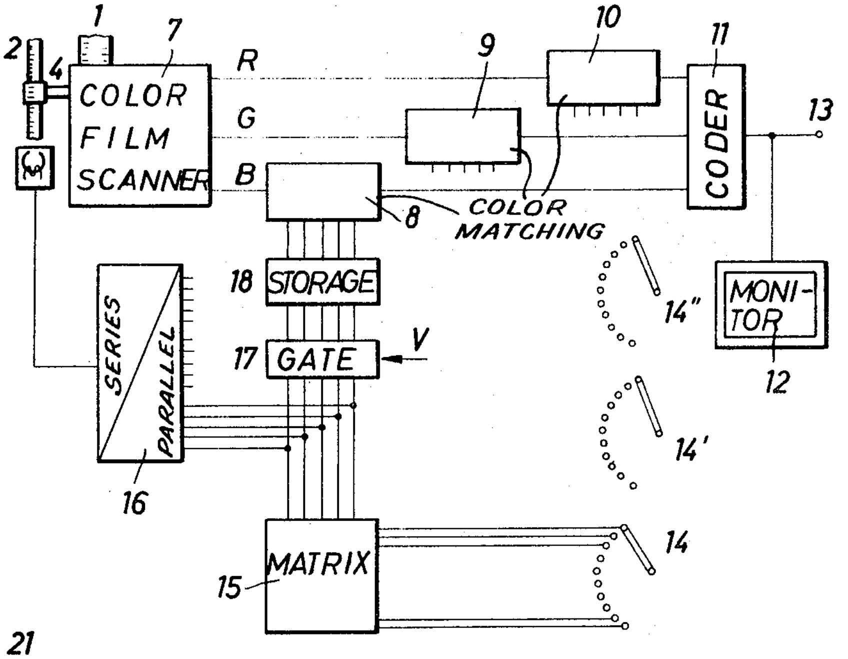
FIG. 2 shows one embodiment of the circuit arrangement according to this invention.

Since the color matching units, or rather each color matching subunit does not have to cover a great control range, even relatively close correction steps can be effected with a relatively small number of binary places in the correction signal. One embodiment of such an arrangement is shown in FIG. 2. The shaft 4 transports the magnetic tape 2 and the film 1 simultaneously. The color signals corresponding to colors red, green and blue, are generated in the film scanner 7. These color signals are each applied to a corresponding color matching subunit, 8,9 and 10, and are then transmitted to a coder 11 whose output is applied to a control monitor 12 and to a terminal 13 for transmission. Each color matching subunit has five control inputs.

The means for entering the color signals onto the elongated signal carrier means comprise adjustment elements 14, 14' and 14''. These are used by an operator to correct color errors prior to transmission. The correction signals furnished, for example, by adjustment element 14, are connected to a matrix 15. This matrix may, for example, convert a 1-out-of-*n* code to a dual code. The five-place binary number resulting from this conversion is applied to the inputs of color matching subunit 8 for control of the blue color signal. Simultaneously, this binary number is entered upon the magnetic tape 5 by means of a parallel-series converter 16 and the magnetic head 6. Of course the signals derived from adjustment elements 14' and 14'' are applied to color matching subunits 9 and 10 in the same fashion. However, the circuits are not indicated on the Figure for the sake of clarity.

The parallel-series converter 16 is a conventional arrangement which converts signals appearing simultaneously in a plurality of channels (parallel signals) into a series of time sequential signals, so that these time sequential signals may, for example, be entered upon the magnetic tape.

During the transmission of the film, the correction signals are read out from the tape and applied again to the arrangement 16 which then operates as a series-parallel converter. The output of the series-parallel converter is then applied to the control inputs of the color matching subunits so that the color correction takes place automatically. Of course the parallel-series converter 16 can be replaced by a modulator which applies the correction signals to a corresponding plurality of carrier signals, each having a different carrier frequency.

In order to eliminate faults in the picture due to changes in the adjustment of the color matching subunits, the correction signals may be applied to the inputs of the color matching subunits by means of a gate 17 and a storage 18, as is shown for the color matching subunit 8 in FIG. 2. The gate 17 is gated by means of a pulse occurring at frame frequency, so that the contents of the storage 8 are applied to the color matching subunit only during the vertical retrace time. The gate 17 and the storage 18 thus serve as input control means for the color matching subunit.

When the correction signals are applied to the magnetic tape in digital form and in time sequential series, a synchronizing signal is added to the correction signals. It is the function of the synchronizing signal to cause each binary place in the binary number to be applied to the correct channel. It is advantageous if the amplitude of the synchronizing signal does not occupy the same amplitude range as the correction signals. In this manner, the synchronizing signal may readily be separated from the correction signals by means of an amplitude discrimination.

A particularly simple form of color matching restricts itself to the adjustment of the amplitudes of the color signals. This is the type of control pictured in the drawings and it forms the basis for the above discussion. Of course, to achieve a closer matching, the contrast and the black level may also be controlled. In that case, adjustment elements 14, 14' and 14'' must each comprise three separate adjustment elements and the color matching subunits 8,9 and 10, as well as the parallel-series converter 16 must be suitable for operating with these additional adjustment elements also.

Figure 3:
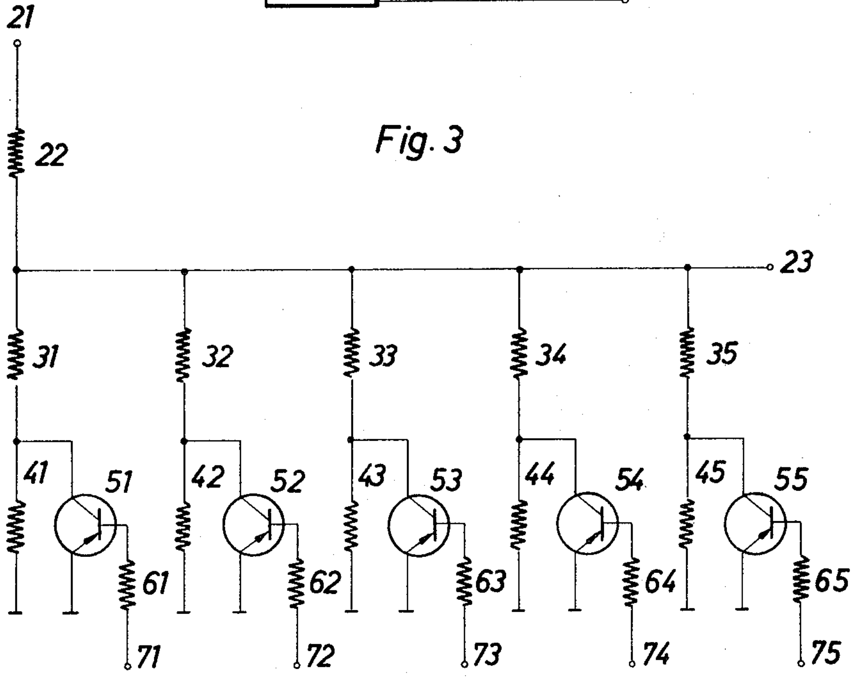
FIG. 3 shows one embodiment of the color matching unit in accordance with this invention.

FIG. 3 shows a particularly advantageous embodiment of color matching subunits 8,9 and 10, for affecting the amplitudes of the color signals to be transported. The circuit shown in FIG. 3 shows a voltage divider to which the color signal to be controlled is applied at terminal 21. The regulated color signal is derived from terminal 23. A resistance 22 is connected to terminal 21 and forms the upper portion of the voltage divider. The other terminal 22 is connected to terminal 23. Also connected to the common point of the terminal of resistance 22 and terminal 23, are a plurality of resistors 31,32,33,34 and 35. The second terminal of each the resistors 31 through 35 is connected to ground via a corresponding one of the resistors 41 through 45 and, via the emitter-collector circuit of a corresponding transistor 51 through 55. To the base of each of these transistors, is applied one binary place of a control signal furnished, respectively, at terminals 71 through 75, which are connected to the bases of transistors 51 through 55, each by means of a corresponding resistor 61 through 65. The transistors are here used as switching means. When all of the transistors are in the non-conductive condition, the maximum transmission through the transmission network (color matching subunit) occurs. The transmission is decreased, when the transistors are switched to the conductive state. It has been found particularly advantageous to select the resistance values of resistors 31 through 35 and 41 through 45 in such a manner that the switching of transistors causes the voltage division of the network to be increased by 0.5, 1, 2, 4, and 8 percent. If all transistors are conductive simultaneously, a decrease in amplitude of 15.5 percent results. If this value is insufficient, of course different resistance values may be selected, or further transistor-resistor branches may be added to the network.

While the invention has been illustrated and described as embodied in a particular color television transmission system for color films, it is not intended to be limited to the details shown, since various modifications and circuit changes, as well as structural changes, may be made without departing in any way from the spirit of the present invention.

What is claimed as new and desired to be protected by Letters Patent is set forth in the appended claims:

1. A color television system for transmitting color films, said color film having additional elongated signal carrier means, comprising, in combination, moving means for transporting said color film and said additional elongated signal carrier means in synchronism along a predetermined path; means for deriving color signals from said color film; a color matching means for correcting color errors in said color signals during transmission, in response to binary correction signals having a first and second state only; means for entering said binary correction signals on said elongated signal carrier means, when required, during a viewing of said film; means for reading out said correction signals from said elongated signal carrier means during transmission of said color signals; and means for conducting said correction signals to the inputs of said color matching means, whereby said color matching means automatically corrects said color errors during transmission of said color signals.

2. A system as set forth in claim 1, wherein said additional elongated signal carrier means comprise a magnetic tape.

3. A system as set forth in claim 2, wherein said magnetic tape comprises magnetic tape having audio signals accompanying said color film recorded thereon.

4. A system as set forth in claim 1, wherein said correction signals comprise first, second, and third correction signals, each for correcting aberration in a predetermined primary color.

5. A system as set forth in claim 4, wherein said elongated signal carrier means has a first, second and third track; further comprising means entering said first, second and third correction signals respectively onto said first, second and third track.

6. A system as set forth in claim 1, wherein said elongated signal carrier means comprise a single track for receiving said correction signals; and wherein said means for entering said correction signals comprise means for entering said correction signals sequentially in time onto said single track.

7. A system as set forth in claim 1, wherein said color matching means comprises a plurality of color matching subunits, each corresponding to a predetermined color; wherein each of said color matching subunits comprises a color matching voltage transmission network, each of said transmission networks comprising a plurality of switching means, each for decreasing the transmission through said transmission network by a predetermined percentage when in a first switching state, each adapted to be in a first or second switching state in response to corresponding correction signals.

8. A system as set forth in claim 7, wherein said voltage transmission networks each comprise a resistance network; and wherein said switching means each comprise a transistor having a conductive and non-conductive state in response to said correction signals, and adapted to short circuit a part of said resistance network when in said conductive state.

9. A system as set forth in claim 8, wherein a transistor in a conductive state decreases the transmission through said voltage transmission network by less than 20 percent.

10. A system as set forth in claim 1, wherein said means for entering said correction signals onto said elongated signal carrier means comprise means for entering said correction signals sequentially in time; further comprising series-parallel converter means for converting signals read out from said elongated signal carrier means to corresponding parallel signals for application to said color matching unit.

11. A system as set forth in claim 1, wherein said means for entering said correction signals comprise means for entering amplitude correction signals.

12. A system as set forth in claim 1, further comprising vertical retrace pulses occurring periodically in said color television transmission; and input control means interconnected between said means for reading out said correction signals and said input of said color matching means for timing the input to said color matching means in synchronism with said vertical retrace pulses.

13. A color television system for transmitting color films, said color films having additional elongated signal carrier means, comprising, in combination, moving means for transporting said color film and said additional elongated signal carrier means in synchronism along a predetermined path; means for deriving color signals from said color film; a color matching means for correcting color errors in said color signals during transmission, said color matching means comprising a plurality of color matching subunits, each corresponding to a predetermined color, each of said color matching subunits comprising a color matching voltage transmission network having a plurality of switching means, each for decreasing the transmission through said transmission network by a predetermined percentage when in a first switching state, each adapted to be in a first or second switching state in response to corresponding correction signals; means for entering said correction signals on said elongated signal carrier means, when required, during a viewing of said film; means for reading out said correction signals from said elongated signal carrier means during transmission of said color signals; and means for furnishing said correction signals to the inputs of said color matching means, whereby said color matching means automatically corrects said color errors during transmission of said color signals.

* * * * *